United States Patent Office 3,585,240
Patented June 15, 1971

---

3,585,240
PROCESS FOR STABILIZING AQUEOUS FORMALDEHYDE SOLUTIONS
Jacob Ackermann and Roberto Croce, Milan, Italy, assignors to Societá Italiana Resine S.p.A., Milan, Italy
No Drawing. Filed June 4, 1968, Ser. No. 734,249
Claims priority, application Italy, June 15, 1967, 17,215/67
Int. Cl. C07c 47/04
U.S. Cl. 260—606
8 Claims

ABSTRACT OF THE DISCLOSURE

Aqueous formaldehyde solutions are stabilised by tetra-azo-phenalenes, particularly decahydro-1,4,7,9-b-tetra-azo-phenalenes.

---

The invention relates to aqueous formaldehyde solutions.

It is known that aqueous formaldehyde solutions are not stable on storage, and become turbid in time on separation of paraformaldehyde. This instability is accentuated at low temperatures.

In order to prevent separation of paraformaldehyde heated tanks may be employed to maintain the solution above its stability temperature, that is above the temperature at which solid products separate.

It is also possible to use stabilizers which prevent the precipitation of paraformaldehyde at temperatures lower than the stability point, In particular it is possible to employ for this purpose methanol, which should, however, be used in high concentrations in order to afford a satisfactory stabilizing effect.

For instance, the necessary methanol percentages for stabilizing a 36% aqueous formaldehyde solution vary with the storage temperature, hence, depending upon the time of year, quantities of about 7 to 13% should be employed. A number of further compounds may be used as stabilizers, such as melamine, phenol, hydrocyanic acid, urea and derivatives thereof, hydrazine, hydroxylamine, phosphoric acid, compounds of the polyvinyl alcohol type, and cellulose derivatives.

However, none of these compounds possess stabilizing properties over long enough periods of time at temperatures below about 5° C., so that high concentrations generally have to be adopted. These give rise to technical difficulties because the formaldehyde solution stabilized in this manner can no longer be employed for all uses which are usually contemplated.

Further compounds such as substituted guanamines can be employed to avoid precipitation of paraformaldehyde from aqueous formaldehyde solutions. However, these very expensive compounds give rise to various shortcomings in subsequent use of the products thereby stabilized. For instance, when this formaldehyde is employed for the synthesis of polymeric materials used as paints or lacquers, finished products are obtained which exhibit colours under the action of ultraviolet light.

It has now been found that the drawbacks arising in the use of stabilizers known in the art may be avoided or mitigated and aqueous formaldehyde solutions may be prepared which are stable within wide ranges of temperature, by the use as novel stabilizers of one or more tetra-azophenalenes.

In a preferred embodiment of the invention the aqueous formaldehyde solution containing the novel stabilizer is heat-treated at temperatures exceeding room temperature.

The preferred stabilizers of this invention are decahydro-1,4,7,9-b-tetra-azo-phenalene and derivatives therof of the formula:

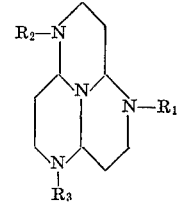

wherein $R_1$, $R_2$ and $R_3$ are selected from hydrogen, aliphatic, cyclo-aliphatic or aromatic hydrocarbon radicals and groups $COR_4$, wherein $R_4$ is an aliphatic hydrocarbon radical preferably containing 1 to 4 carbon atoms.

The stabilizer is preferably in a qauntity of 0.05 to 1.0% by weight with respect to the formaldehyde solution.

In the preferred embodiment the aqueous formaldehyde solution containing the stabilizer in the abovementioned quantities is maintained at a temperature exceeding about 40° C., but lower than the boiling temperature at atmospheric pressure, for a period of time ranging between 30 minutes and 20 hours.

Aqueous formaldehyde solutions are thereby obtained which are stable over long periods of time at temperatures down to about −10° C.

By the above described heat treatment the stabilizing effect is improved, so that smaller quantities of stabilizer will be sufficient, and discolouration processes which appear, though lightly, on carrying out the treatment at room temperature or, in any case, at temperatures below about 40° C., are avoided.

The process of the invention affords the advantage of utilizing as stabilizers compounds which are cheap and easily available, since they are used as fungicides, insecticides and dyestuffs.

Moreover, the process is easily carried out on a commercial scale because the stabilizer may be supplied directly to the formaldehyde absorbing columns.

In the following examples the solutions were submitted after heat treatment in the presence of the stabilizer to a test while they were kept at low temperature during a period of 24 hours.

The test was held to be positive when the formaldehyde solution was free from turbidity or bottom deposit after the abovementioned period of time.

It should be noted that formaldehyde solutions which do not separate paraformaldehyde under the test conditions are stable at room temperature during a number of months.

EXAMPLE 1

400 g. commercial formaline titrating 36% by weight formaldehyde were charged to a flask and heated to 70° C. The formaline contained 0.9% methanol and 0.08% formic acid. The stirred solution was admixed with 0.4 g. decahydro-1,4,7,9-b-tetra - azo - phenalene gradually and over a period of 30 minutes. The solution was then maintained in a stirred condition at the abovementioned temperature for 7 hours.

The stability of the product was compared with formaline which had undergone the same heat treatment, but without the stabilizer.

The control formaline became highly turbid after 3-4 hours at 0° C., whilst the stablized product was still perfectly clear after 24 hours at 0° C.

EXAMPLE 2

The compound of formula

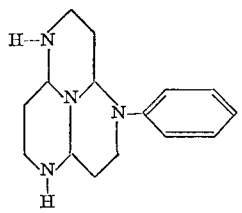

was employed as a stabilizer in the manner of Example 1 and was admixed in a quantity of 0.15% by weight with a 38% formaline solution containing 1.1% methanol and 0.02% formic acid. Heating at 90° C. for 15 minutes followed, whereafter the solution was allowed to cool to room temperature.

The stabilized product was still perfectly clear after 24 hours at —5° C., whereas a control sample without stabilizer was of a thick consistency, the solid product being in a granulated form, after the same period of time.

EXAMPLE 3

The procedure described in Example 2 was followed, the compound of formula

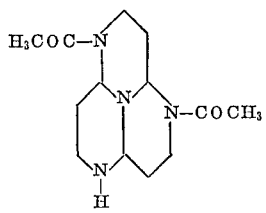

being used as a stabilizer, admixed in a quantity of 0.4% by weight with respect to a formaline solution as used in Example 2.

The stabilized product was still fully clear after 24 hours storage at —5° C., whereas a control solution without stabilizer was of a thick consistency, the solid product being in a granulated form.

What we claim is:

1. An aqueous formaldehyde solution comprising from about 0.05 to about 1% by weight, with respect to the formaldehyde solution, of a water-soluble decahydro-1,4,7,9-b-tetra-azo-phenalene compound of the formula:

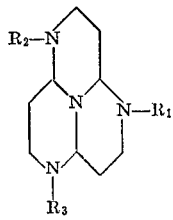

wherein $R_1$, $R_2$ and $R_3$ are selected from the group consisting of hydrogen, aliphatic, cycloaliphatic and, aromatic hydrocarbon radicals and $COR_4$, wherein $R_4$ is an aliphatic hydrocarbon radical containing one to four carbon atoms.

2. The solution of claim 1 wherein the aqueous formaldehyde solution contains up to about 38% formaldehyde.

3. The solution of claim 1 wherein the aqueous formaldehyde solution contains from about 36% up to about 38% formaldehyde.

4. The solution of claim 3 wherein the stabilizer is selected from the group consisting of

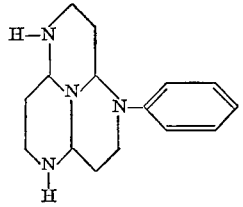

and

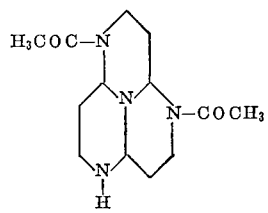

5. A method for preventing paraformaldehyde precipitation in an aqueous formaldehyde solution which comprises adding to said aqueous formaldehyde solution from about 0.05 to about 1% by weight, with respect to the formaldehyde solution, of a water-soluble decahydro-1,4,7,9-b-tetra-azo-phenalene compound of the formula:

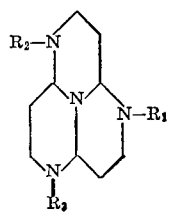

wherein $R_1$, $R_2$ and $R_3$ are selected from the group consisting of hydrogen, aliphatic, cycloaliphatic and, aromatic hydrocarbon radicals and $COR_4$, wherein $R_4$ is an aliphatic hydrocarbon radical having from one to four carbon atoms, and maintaining said aqueous formaldehyde solution containing said stabilizer at a temperature exceeding about 40° C. but lower than the boiling point of the solution at atmospheric pressure for a period of time of from about 30 minutes to about 20 hours.

6. The process of claim 5 wherein the aqueous formaldehyde solution contains up to about 38% formaldehyde.

7. The process of claim 5 wherein the aqueous formaldehyde solution contains from about 36% to about 38% formaldehyde.

8. The process of claim 5 wherein said stabilizer is selected from the group consisting of

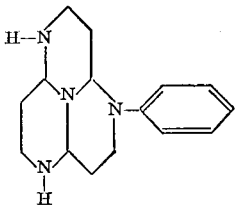

and
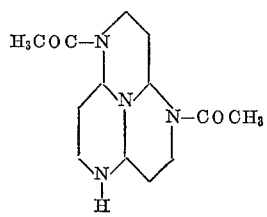
References Cited
UNITED STATES PATENTS
| | | | |
|---|---|---|---|
| 3,202,681 | 8/1965 | Dexter et al. | 260—601X |
| 3,112,314 | 11/1963 | Van Winkle | 260—256.4 |
| 2,000,152 | 5/1935 | Walker | 260—606 |
BERNARD HELFIN, Primary Examiner
R. H. LILES, Assistant Examiner
U.S. Cl. X.R.
260—256.4